United States Patent
King, Sr.

[11] Patent Number: 6,062,247
[45] Date of Patent: May 16, 2000

[54] ONE-PIECE SHUT-OFF VALVE

[76] Inventor: Lloyd Herbert King, Sr., 400 Seasage Dr. Unit 1006, Delray Beach, Fla. 33483

[21] Appl. No.: 09/174,340

[22] Filed: Oct. 19, 1998

[51] Int. Cl.[7] .............................. F16K 17/14; F16K 15/00
[52] U.S. Cl. ............................ 137/71; 137/519; 137/517
[58] Field of Search ..................... 137/710, 517, 137/519.5, 519, 859, 223; 251/902

[56] References Cited

U.S. PATENT DOCUMENTS

| | | | |
|---|---|---|---|
| 290,824 | 12/1883 | Westgate | 137/519 |
| 530,442 | 12/1894 | Munger | 137/517 |
| 2,246,621 | 6/1941 | Davis | 303/84 |
| 2,353,191 | 7/1944 | Samiran | 137/153 |
| 2,674,262 | 4/1954 | Bradshaw | 137/517 |
| 2,763,286 | 9/1956 | Wilson | 137/486 |
| 2,821,209 | 1/1958 | Waterman | 137/498 |
| 2,926,686 | 3/1960 | Gheen | 137/517 X |
| 3,513,485 | 5/1970 | Davila | 137/519 X |
| 4,308,885 | 1/1982 | Geissler | 137/67 |
| 5,067,690 | 11/1991 | Bac | 251/149.8 |
| 5,232,012 | 8/1993 | Toraason | 137/498 |
| 5,465,752 | 11/1995 | Higgins | 137/517 X |
| 5,469,883 | 11/1995 | Lee | 137/513.3 |
| 5,535,778 | 7/1996 | Zakai | 137/498 |
| 5,727,594 | 3/1998 | Choksi | 137/859 |

*Primary Examiner*—Denise L. Ferensic
*Assistant Examiner*—Joanne Y. Kim
*Attorney, Agent, or Firm*—Jacobson & Johnson

[57] ABSTRACT

A one-piece polymer plastic shut-off valve that includes a conduit with a first end having a sealing surface thereon and an engagement surface for connection to a fluid system and a plug with a further sealing surface that is yieldably supported in a spaced condition from the sealing surface of the conduit by elongatable supports to allow fluid to flow through said conduit under a first flow condition when the elongated supports are not extended and to prevent flow of fluid through said conduit under a second flow condition when the elongated supports are extended.

11 Claims, 4 Drawing Sheets

006,062,247

ONE-PIECE SHUT-OFF VALVE

FIELD OF THE INVENTION

This invention relates to automatic shut-off vales and more specifically, to a one-piece shutoff valve which is responsive to the fluid resistance in a system with the one-piece shut-off valve moldable in one-piece from materials such as polymer plastics.

BACKGROUND OF THE INVENTION

The concept of shut-off valves that automatically shut off the flow of fluid through a fluid line in response to a fault condition are known in the art. Typically, such shut-off valves are made from multiple parts and are quite complex. The present invention provides for a one-piece shut-off valve that can be molded in one operation to produce a low cost shut-off valve that can be used in irrigation systems to shut off the flow of water should a sprinkler head get damaged.

DESCRIPTION OF THE PRIOR ART

U.S. Pat. No. 2,821,209 discloses a hydraulic fuse that includes a spring that compresses to allow a piston to seal off a flow passage through the hydraulic fuse;

U.S. Pat. No. 2,246,621 discloses a hydraulic brake that includes a diaphragm that carries a plug thereon to seal off one side of a brake system to prevent loss of brakes;

U.S. Pat. No. 2,353,191 discloses a spring loaded automatic shut-off valve;

U.S. Pat. No. 5,067,690 discloses a self-closing device for connecting containers that includes a rigid valve that slides within a tube to close off the tube;

U.S. Pat. No. 5,469,883 discloses a flow modulation device having an elastic deformable flap for restricting fluid flow therethrough;

U.S. Pat. No. 4,308,885 discloses a tubular safety element for closing a high pressure fluid line;

U.S. Pat. No. 2,763,286 discloses an automatic valve control mechanism that uses a diaphragm and a spring to control the fluid flow;

U.S. Pat. No. 5,535,778 discloses a self closing valve for flushing drip irrigation lines with the diaphragm flexing sufficient to close the discharge opening therein; and U.S. Pat. No. 5,233,012 discloses a dual diaphragm fluid flow device to regulate the flow of fluid therethrough.

SUMMARY OF THE INVENTION

Briefly, the present invention comprises a one-piece polymer plastic shut-off valve that includes a conduit with a first end having a sealing surface thereon and an engagement surface for connection to a fluid system and a plug with a further sealing surface that is yieldably supported in a spaced condition from the sealing surface of the conduit to allow fluid to flow through said conduit under a first fluid condition and to prevent flow of fluid through said conduit under a second fluid condition.

DESCRIPTION OF THE PREFERRED EMBODIMENT

Figure 1:
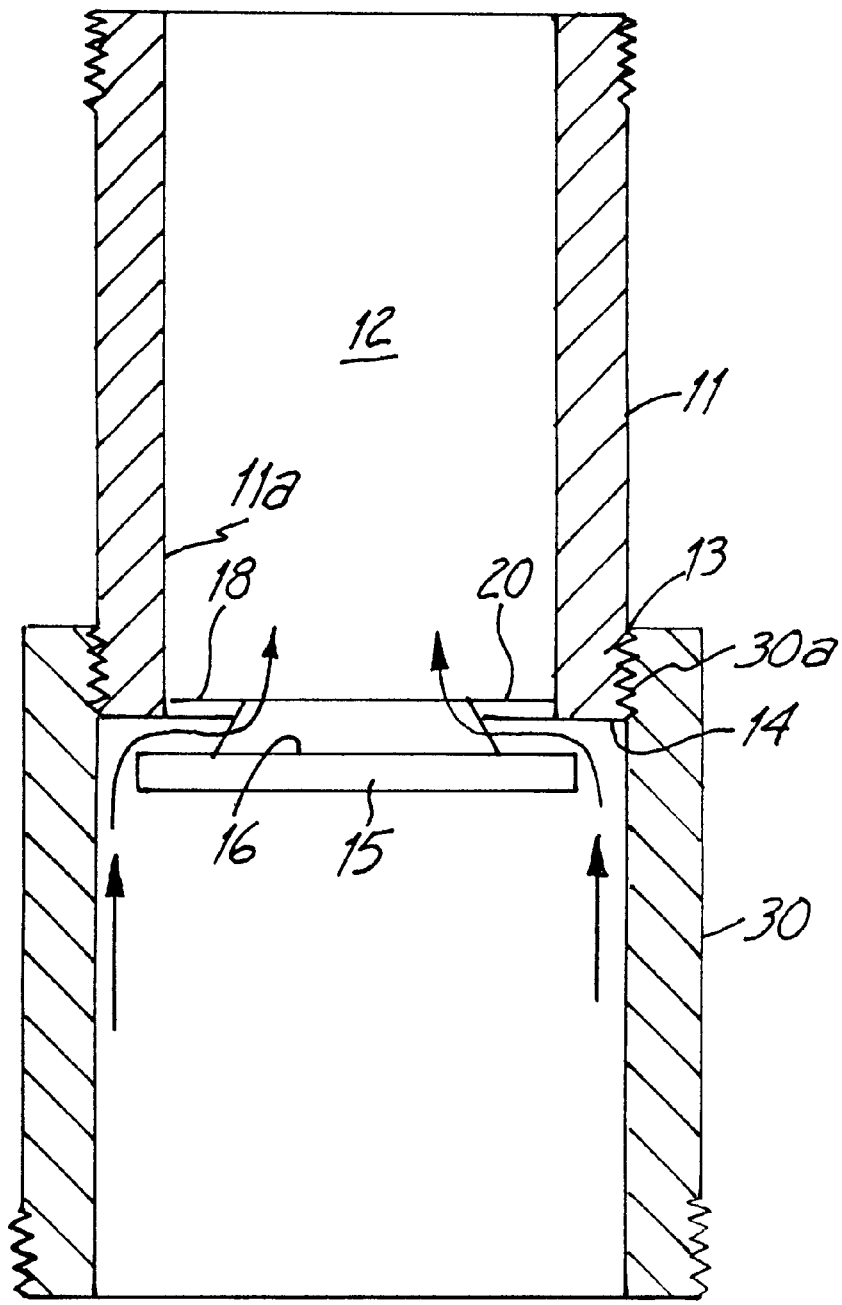
FIG. 1 is a partial cross-sectional view of the one-piece polymer plastic shut-off valve showing the conduits in cross section.
Figure 2:
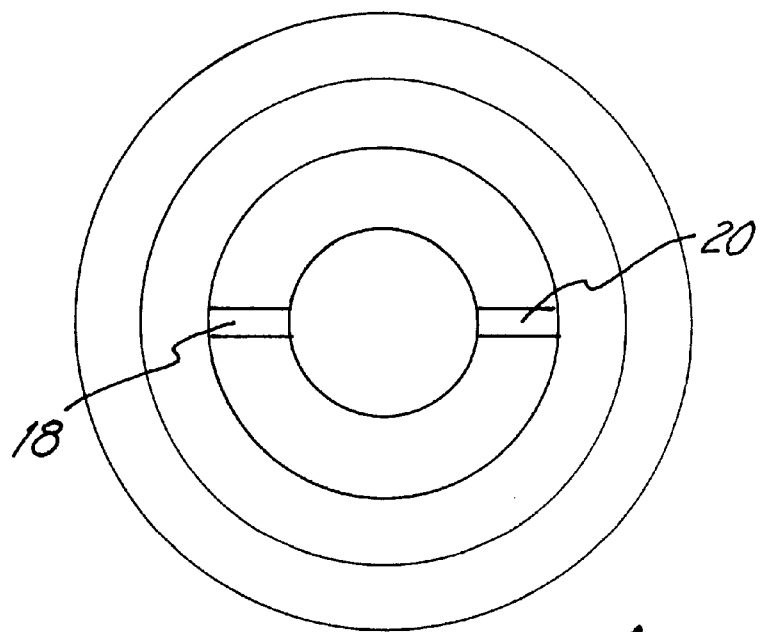
FIG. 2 is a top view of the one-piece polymer plastic shut-off valve shown in FIG. 1.

FIG. 1 is a partial cross sectional view of a one-piece polymer plastic shut-off valve 10 including a cylindrical conduit 11 having a central opening 12. The lower end of conduit 11 includes an annular sealing surface 14. Held in a spaced condition form annular sealing surface 14 by a set of two integral straps is a plug 15 which also has an annular sealing surface 16 thereon for forming sealing engagement with annular sealing surface 14. FIG. 2 shows the set of two integral straps comprising yieldable support member 18, and 20 that extend radially inward from interior surface 11a (FIG. 1) to support plug 15 in a central and spaced condition with respect to the central opening 12 in conduit 11. By holding plug 15 in the spaced condition from sealing surface 14, fluid can flow from conduit 30 and into conduit 11.

In order to provide for the attachment of conduit 30 to conduit 11, the lower external end of conduit 11 contains a set of external threads 13 that are in engagement with internal threads 30a on a conduit 30.

The plug 15, integral yieldable support members 18 and 20 and the conduit 11 are shown molded from a single piece of polymer plastic such as polypropylene or the like. In the condition shown in FIG. 1, the yieldable support members are in a first flow condition wherein the yieldable support members support plug 15 in a spaced condition from first end sealing surface 14 to permit fluid to flow around plug 15 and between sealing surfaces 14 and 16 and into opening 12 in conduit 11. The arrows generally indicate the direction of flow of fluid through the shut-off valve 10.

Figure 3:
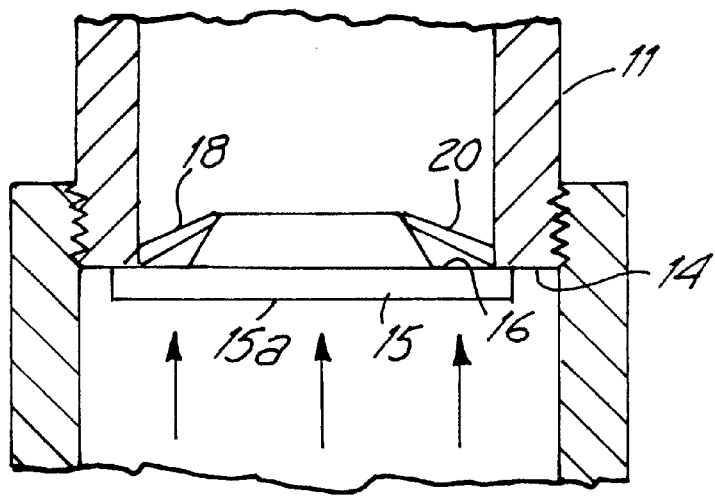
FIG. 3 is a partial sectional view of the one-piece polymer plastic shut-off valve of FIG. 1 in the closed condition.

To illustrate the closed condition of valve 10, reference should be made to FIG. 3 which is a partial sectional view of the one-piece polymer plastic shut-off valve 10. In the closed condition, plug sealing surface 16 abuts against sealing surface 14 on conduit 11 to prevent fluid from flowing therebetween. In this condition, the integral straps no longer extend perpendicularly inward toward plug 15 but are angled upward in response to the fluid pressure forces on plug face 15a.

Figure 4:
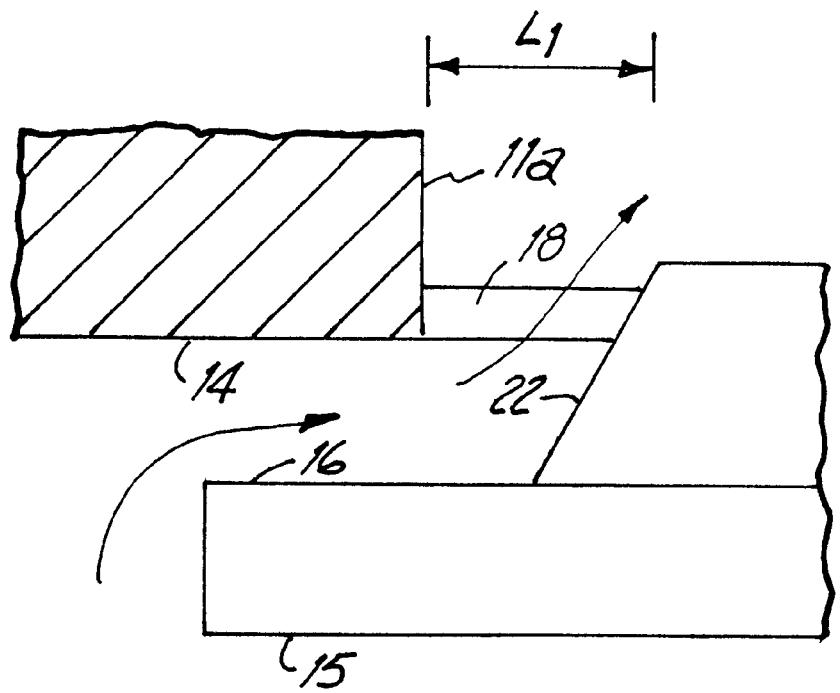
FIG. 4 is an enlarged partial section showing one of the yieldable supports in the normal condition to allow flow of fluid through the valve.
Figure 5:
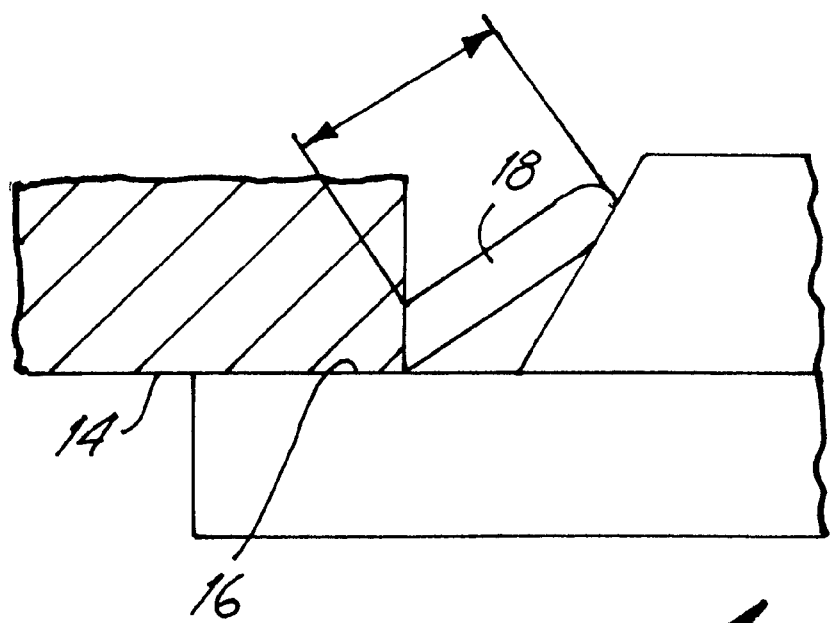
FIG. 5 is an enlarged partial sectional view similar to FIG. 4 illustrating the elongation of the yield support to prevent flow of fluid through the valve.

To illustrate the operation of the integral straps as the valve goes from a first fluid condition to a second fluid condition, reference should be made to FIG. 4 and FIG. 5. FIG. 4 is an enlarged partial section showing yieldable support 18 in the normal fluid condition to allow flow of fluid through the valve. That is, sealing surface 14 and sealing surface 16 are spaced from each other to allow flow of fluid therebetween. The yieldable support 18 is shown having a length $L_1$ with one end of yieldable support connected to surface 11a and the other end connected to surface 22. The yieldable support is made sufficiently strong so that under normal flow conditions with a down stream resistance connected to conduit 11, the pressure differential forces across the plug 15 are insufficient to force plug 15 into a closed condition as shown in FIG. 3.

FIG. 5 is an enlarged partial sectional view similar to FIG. 4 illustrating what occurs in a second fluid condition where the pressure differential forces across the plug have exceeded a threshold value. When the differential pressure forces exceed the threshold value, the integral support member 18 begins to yield and stretch. As the support members stretch, the flow area between sealing surface 14 and 15 decreases which causes the pressure differential to further increase. Consequently, the forces on plug cause further stretching of integral support members until the integral support members are stretched to a length $L_2$ which is illustrated by integral support member 18 in FIG. 5. In this condition, the annular sealing surface 16 has moved upward to engage annular sealing surface 14 to thereby prevent flow of fluid therebetween and through the valve. As the fluid ceases to flow through the shut-off valve, the stagnation pressure on the downstream side of the plug is sufficient to maintain plug 15 in the sealed or closed condition as shown in FIG. 3. In the embodiment shown, the integral support member 18 extends from length L1 to L2 with the elongation insufficient to exceed the elastic limit of the material. That is, by positioning plug 15 so that the amount of travel of the plug 15 from the first flow condition (open) to the second fluid condition (closed) is sufficiently small so that the integeral strap which supports plug 15 is not stretched beyond its elastic limit so one can reuse valve 10. Thus, by maintaining the amount of elongation of the several straps within the elastic limits of the material, I provide resilient straps that can restore the plug to the open condition once the problem has been repaired.

Figure 6:
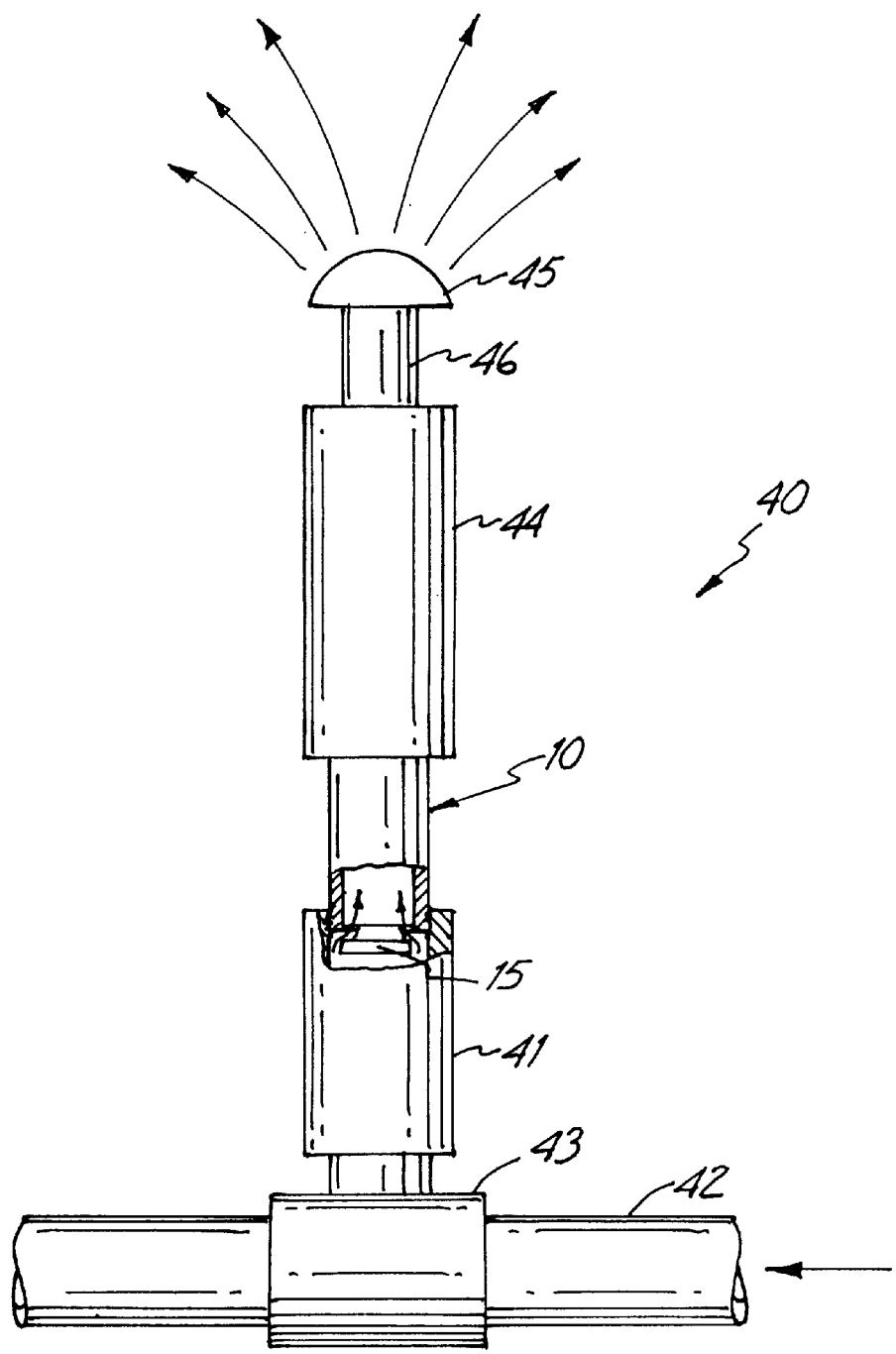
FIG. 6 shows an irrigation system with my shut-off valve mounted thereon to shut off the flow of water through the irrigation head in the event the irrigation head is broken off.

In order to understand the operation of my valve 10 with a downstream resistance, reference should be made to FIG. 6 which shows a portion of an irrigation system 14 with my shut-off valve 10 mounted thereon to shut off the flow of water through the irrigation head 45 in the event the irrigation head is broken off. That is, a pipe 42 normally supplies water to tee 43 which directs water trough pipe 41 and into shut-off valve 10. Shut-off valve 10 directs water through pipe 46 and through irrigation head 45. The postion of pipe 44 and irrigation head 45 on the downstream side of shut-off valve provides a downstream resistance to the flow of fluid through the irrigation head 45. This resistance ensures that the pressure differential across plug 16 is sufficiently small so that the yieldable members 18 and 20 have sufficient strength to maintain the plug in a spaced but central location when water flows through irrigation head 45. That is, the pressure differential across the plug 15 does not produce sufficient forces on plug 15 to force plug 15 into the sealed condition. However, if the irrigation head 45 should be accidentally broken off one immediately loses the downstream resistance of the irrigation head. In this condition, the lack of downstream resistance causes the differential pressure forces across plug 15 become sufficiently large so that the yieldable members 18 and 20 begin to stretch. As the yieldable members stretch, the fluid flow area through the shut-off valve continues to decrease which causes the pressure differential forces across the plug to become even larger, which cause the plug sealing surface 16 to snap against lower sealing surface 14 thereby preventing further flow of fluid therethrough. When the pressure is removed, the resilient members 18 and 20 force plug 15 back into the positions shown in FIG. 1. In this condition the fluid can flow through the shut-off valve 10. Thus the present invention provides for a reusable shut-off valve that prevents waste of fluid if an end component of the system is damaged.

Although my invention is shown with male coupling the unit can be used with either male or female couplings. In addition, valve 10 could be directly coupled to tee 43, if desired. A further aspect of my invention is that one size can be used with different systems thorough use of enlarger or reducer couplings.

What is claimed is:

1. A one-piece polymer plastic shut-off valve comprising:
    a conduit having a first end and a second end with the first end having a sealing surface thereon;
    a plug, said plug having a sealing surface for forming sealing relationship with said sealing surface on said first end of said conduit;
    a set of yieldable plug supports integrally connected to said conduit and connected to said plug, said plug having a first condition wherein the yieldable plug supports normally support said sealing surface on said plug in a spaced condition from said sealing surface on said first end so that fluid can flow around said plug and into the first end of said conduit, and a second condition wherein the yieldable plug supports extend to allow the sealing surface on said plug to contact the sealing surface on said first end to thereby prevent fluid from flowing through said first conduit, said yieldable plug supports contractible to separate the sealing surface on said plug and said sealing surface on said first end to allow fluid therethrough.

2. The one-piece shut-off valve of claim 1 wherein the yieldable plug supports are made from a resilient material.

3. The one-piece shut-off valve of claim 1 wherein the conduit is cylindrical and the plug is cylindrical.

4. The one-piece shut-off valve of claim 1 including a set of external threads on said second end of said conduit for attachment of a second conduit thereto.

5. The one-piece shut-off valve of claim 1 wherein the one-piece shut-off valve is made of polypropylene.

6. The one-piece shut-off valve of claim 4 including an irrigation head connected thereto.

7. The one-piece shut-off valve of claim 1 wherein each of the yieldable supports have a first end integrally connected to the first end of the conduit, and a second end integrally connected to said plug.

8. The one-piece shut-off valve of claim 1 wherein the sealing surface on said plug comprises an annular sealing surface and the sealing surface on said conduit comprises an annular sealing surface.

9. The one-piece shut-off valve of claim 1 wherein the sealing surface on said plug and the sealing surface on said conduit are normally held in a spaced apart parallel condition.

10. A one piece shut-off valve for disrupting the flow of fluid thereto in the event of a line rupture comprising;
    a conduit having a first end and a second end with the first end having a sealing surface thereon;
    a pressure responsive plug, said plug having a sealing surface for forming sealing relationship with said sealing surface on said first end of said conduit;
    said pressure responsive plug connected to said conduit with yieldable resilient supports for closing off an opening in said conduit to prevent flow of fluid therein, said plug normally positioned from said conduit to enable flow of fluid past said plug and into said conduit when the fluid resistance is sufficient to maintain a pressure differential across said plug below a threshold value, said plug automatically postionable to close off flow of fluid through said conduit in response to a second flow condition whereby the fluid resistance has been diminished sufficiently so that the pressure differential across said plug exceeds the threshold value, said yieldable resilient supports contracting when the second condition is removed so that the yieldable resilient supports can retract to open said one-piece shut off valve; and a fluid resistance located downstream of said conduit said fluid resistance separate from said one-piece shut off valve.

11. The shut-off valve of claim 10 wherein the yieldable resilient supports are made from a resilient material.

* * * * *